US012759276B2

(12) United States Patent
Tang et al.

(10) Patent No.: US 12,759,276 B2
(45) Date of Patent: Oct. 13, 2026

(54) BONDING PANEL CORE TO FIBER-REINFORCED THERMOPLASTIC SKIN(S)

(71) Applicant: Rohr, Inc., Chula Vista, CA (US)

(72) Inventors: Alfred Y. Tang, Riverside, CA (US); Shyan Bob Shen, San Diego, CA (US); Ryan M. Robinson, San Diego, CA (US); Basheer Afaneh, Norco, CA (US); Jeffrey D. Woods, Beaumont, CA (US)

(73) Assignee: Rohr, Inc., Chula Vista, CA (US)

( * ) Notice: Subject to any disclaimer, the term of this patent is extended or adjusted under 35 U.S.C. 154(b) by 92 days.

(21) Appl. No.: 18/629,808

(22) Filed: Apr. 8, 2024

(65) Prior Publication Data

US 2025/0313003 A1 Oct. 9, 2025

(51) Int. Cl.

| | |
|---|---|
| ***B32B 37/06*** | (2006.01) |
| ***B32B 3/12*** | (2006.01) |
| ***B32B 15/08*** | (2006.01) |
| ***B32B 27/08*** | (2006.01) |
| ***B32B 38/04*** | (2006.01) |

(Continued)

(52) U.S. Cl.

CPC ................ *B32B 37/06* (2013.01); *B32B 3/12* (2013.01); *B32B 15/08* (2013.01); *B32B 27/08* (2013.01); *B32B 38/04* (2013.01); *B32B 38/162* (2013.01); *B32B 37/1018* (2013.01); *B32B 2038/047* (2013.01); *B32B 2250/03* (2013.01); *B32B 2305/024* (2013.01); *B32B 2305/08* (2013.01)

(58) Field of Classification Search

CPC ......... B32B 3/12; B32B 37/146; B32B 37/06; B32B 37/1018; B32B 2305/024; B32B 2305/08; B32B 2310/0812; B32B 15/08; B32B 27/08; B32B 38/04; B32B 38/162; B32B 2038/047; B32B 2250/03; B29C 66/725; B29C 66/72525; B29C 66/7254; B29C 65/32

USPC ........................................... 156/272.2, 379.6

See application file for complete search history.

(56) References Cited

U.S. PATENT DOCUMENTS

| | | | | |
|---|---|---|---|---|
| 5,066,536 | A * | 11/1991 | Cogswell | B29C 66/72141 428/401 |
| 6,565,942 | B2 | 5/2003 | Anderson | |
| 10,058,950 | B1 | 8/2018 | Gerken | |

(Continued)

FOREIGN PATENT DOCUMENTS

| | | | | |
|---|---|---|---|---|
| CN | 115056496 | A | 9/2022 | |
| EP | 2508329 | A1 * | 10/2012 | B29C 70/46 |

*Primary Examiner* — John L Goff, II

(74) *Attorney, Agent, or Firm* — Getz Balich LLC

(57) ABSTRACT

A formation method is provided during which a honeycomb core, a thermoplastic film and a fiber-reinforced thermoplastic skin are arranged in a stack with the thermoplastic film between the honeycomb core and the fiber-reinforced thermoplastic skin. The thermoplastic film comprises a thermoplastic material. A metal conductor is arranged on the stack with the fiber-reinforced thermoplastic skin between the thermoplastic film and the metal conductor. The metal conductor is induction heated to provide a heated metal conductor. The thermoplastic film is conduction heated through the fiber-reinforced thermoplastic skin using the heated metal conductor to melt the thermoplastic film and bond the fiber-reinforced thermoplastic skin to the honeycomb core with the thermoplastic material.

14 Claims, 8 Drawing Sheets

(51) Int. Cl.

| | |
|---|---|
| ***B32B 38/16*** | (2006.01) |
| *B32B 37/10* | (2006.01) |

(56) References Cited

U.S. PATENT DOCUMENTS

| | | | | | |
|---|---|---|---|---|---|
| 11,220,064 | B2 | 1/2022 | Matsen | | |
| 2005/0079989 | A1* | 4/2005 | Weir | C11D 7/266 | 510/438 |
| 2010/0035018 | A1* | 2/2010 | Horigome | B32B 3/12 | 428/116 |
| 2014/0231402 | A1* | 8/2014 | Matsen | B29C 35/0805 | 219/212 |
| 2020/0196402 | A1* | 6/2020 | Matsen | B29C 33/06 | |

* cited by examiner

BONDING PANEL CORE TO FIBER-REINFORCED THERMOPLASTIC SKIN(S)

BACKGROUND

1. Technical Field

This disclosure relates generally to a structured panel and, more particularly, to forming a structured panel such as an acoustic panel.

2. Background Information

An aircraft propulsion system may include a sandwich panel such as an acoustic panel. Various methods for forming an acoustic panel are known in the art. While these known acoustic panel formation methods have various benefits, there is still room in the art for improvement.

SUMMARY OF THE DISCLOSURE

According to an aspect of the present disclosure, a formation method is provided during which a honeycomb core, a thermoplastic film and a fiber-reinforced thermoplastic skin are arranged in a stack with the thermoplastic film between the honeycomb core and the fiber-reinforced thermoplastic skin. The thermoplastic film comprises a thermoplastic material. A metal conductor is arranged on the stack with the fiber-reinforced thermoplastic skin between the thermoplastic film and the metal conductor. The metal conductor is induction heated to provide a heated metal conductor. The thermoplastic film is conduction heated through the fiber-reinforced thermoplastic skin using the heated metal conductor to melt the thermoplastic film and bond the fiber-reinforced thermoplastic skin to the honeycomb core with the thermoplastic material.

According to another aspect of the present disclosure, another formation method is provided during which a thermoplastic film is arranged on a cellular core. The thermoplastic film comprises thermoplastic material. The cellular core includes a plurality of cavities and a plurality of sidewalls. Each of the cavities extends vertically through the cellular core. Each laterally adjacent pair of the cavities is separated by a respective one of the sidewalls. A fiber-reinforced thermoplastic skin is arranged on the thermoplastic film with the thermoplastic film between the fiber-reinforced thermoplastic skin and the cellular core. A plate is arranged on the fiber-reinforced thermoplastic skin with the fiber-reinforced thermoplastic skin between the plate and the thermoplastic film. The fiber-reinforced thermoplastic skin is bonded to the sidewalls using the thermoplastic material. The bonding includes heating the plate using an induction coil to provide a heated plate, and heating the thermoplastic film to melt the thermoplastic material using the heated plate.

According to still another aspect of the present disclosure, another formation method is provided during which a cellular core, a film of thermoplastic resin and a fiber-reinforced thermoplastic skin are arranged in a stack with the film between the cellular core and the fiber-reinforced thermoplastic skin. The cellular core includes a plurality of cavities and a plurality of sidewalls. Each of the cavities extends vertically through the cellular core. Each laterally adjacent pair of the cavities is separated by a respective one of the sidewalls. A plate is arranged on the stack with the fiber-reinforced thermoplastic skin between the plate and the film. The stack and the plate are vacuum bagged to preload the stack between the plate and a rigid support supporting the cellular core. The fiber-reinforced thermoplastic skin is bonded to the sidewalls using the thermoplastic resin. The bonding includes heating the plate to melt the thermoplastic resin by way of conductive heating through the fiber-reinforced thermoplastic skin.

The formation method may also include vacuum bagging the cellular core, the thermoplastic film, the fiber-reinforced thermoplastic skin and the plate to preload a stack of the cellular core, the thermoplastic film and the fiber-reinforced thermoplastic skin between the plate and a rigid support supporting the cellular core.

The thermoplastic material may adhere the sidewalls to the fiber-reinforced thermoplastic skin.

The cellular core may be configured as or otherwise include a metal material.

The formation method may also include biasing the metal conductor towards the honeycomb core during the induction heating and the conduction heating.

The metal conductor may be biased towards the honeycomb core using a vacuum bag.

The thermoplastic material may be a thermoplastic resin. The thermoplastic film may only include the thermoplastic resin.

When the fiber-reinforced thermoplastic skin is bonded to the honeycomb core with the thermoplastic material, the thermoplastic material may be melted to adhere the fiber-reinforced thermoplastic skin to the honeycomb core.

The honeycomb core may include a sidewall. A pair of fillets formed by the thermoplastic material may extend along and contact opposing sides of the sidewall when the fiber-reinforced thermoplastic skin is bonded to the honeycomb core with the thermoplastic material.

The formation method may also include supporting the stack on a rigid support during the induction heating and the conduction heating.

The honeycomb core may be configured from or otherwise include a metal material.

The honeycomb core may be configured from or otherwise include a non-metal material.

The fiber-reinforced thermoplastic skin may be bonded to the honeycomb core with the thermoplastic material to provide a first structure. The formation method may also include: arranging the first structure, a second thermoplastic film and a second fiber-reinforced thermoplastic skin in a second stack with the second thermoplastic film between the honeycomb core and the second fiber-reinforced thermoplastic skin, the second thermoplastic film comprising a second thermoplastic material; arranging the metal conductor on the second stack with the second fiber-reinforced thermoplastic skin between the second thermoplastic film and the metal conductor; induction heating the metal conductor to provide a reheated metal conductor; and conduction heating the second thermoplastic film through the second fiber-reinforced thermoplastic skin using the reheated metal conductor to melt the second thermoplastic film and bond the second fiber-reinforced thermoplastic skin to the honeycomb core with the second thermoplastic material and provide a sandwich structure.

The formation method may also include perforating the fiber-reinforced thermoplastic skin or the second fiber-reinforced thermoplastic skin to configure the sandwich structure as an acoustic panel.

The formation method may also include cleaning the honeycomb core prior to arranging the honeycomb core in the stack.

The formation method may also include cleaning the thermoplastic film prior to arranging the thermoplastic film in the stack.

The formation method may also include cleaning the fiber-reinforced thermoplastic skin prior to arranging the fiber-reinforced thermoplastic skin in the stack.

The thermoplastic material may be configured from or otherwise include at least one of polyamide (PA), polyamide-imide (PAI), polyarylsulfone (PAS), polyethersulfone (PES), polyoxymethylene (POM), polyphenylene sulphide (PPS), polyether ether ketone (PEEK), polyetherimide (PEI), polyethylene terephthalate (PET), polyphthalamide (PPA), poly ether ketone ketone (PEKK), or poly aryl ether ketone (PAEK).

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

The present disclosure includes methods for forming a structured panel; e.g., a sandwich panel. The term "forming" may describe a method for original manufacture of the structured panel; e.g., creating a brand new structured panel. The term "forming" may also or alternatively describe a method for remanufacture or otherwise repairing of the structured panel; e.g., restoring one or more features of a previously formed structured panel to brand new condition, similar to brand new condition, better than brand new condition, etc. The term "structured" may be used to describe a relatively stiff panel; e.g., a panel including a cellular core which is connected to and structurally supports and/or reinforces one or more skins as described below. This structured panel may or may not form a structural member of another device or structure. Such structured panels are relatively lightweight and, thus, beneficial for use in the aerospace industry, for example.

Figure 1:
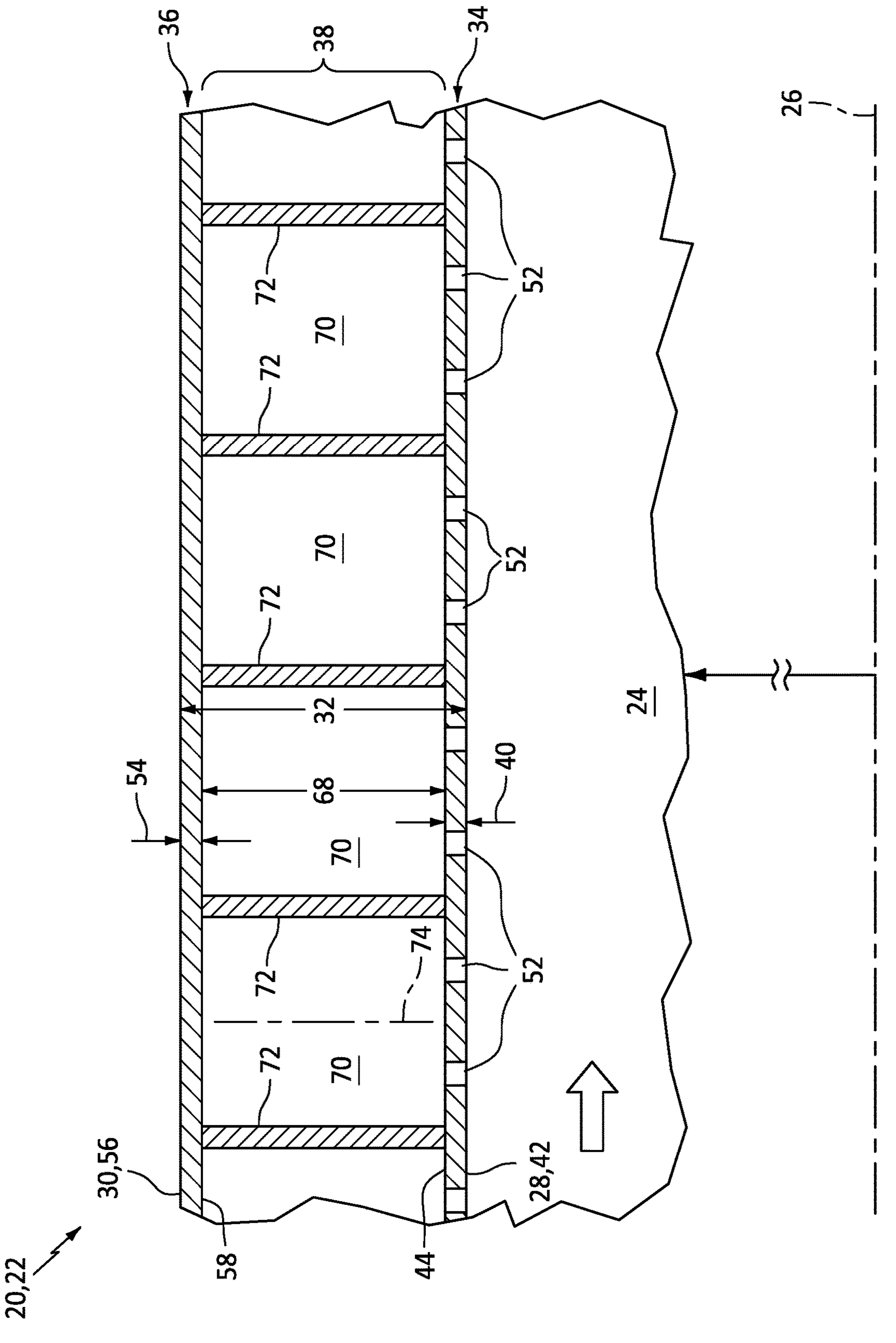
FIG. 1 is a partial side sectional illustration of an acoustic panel.
Figure 2:
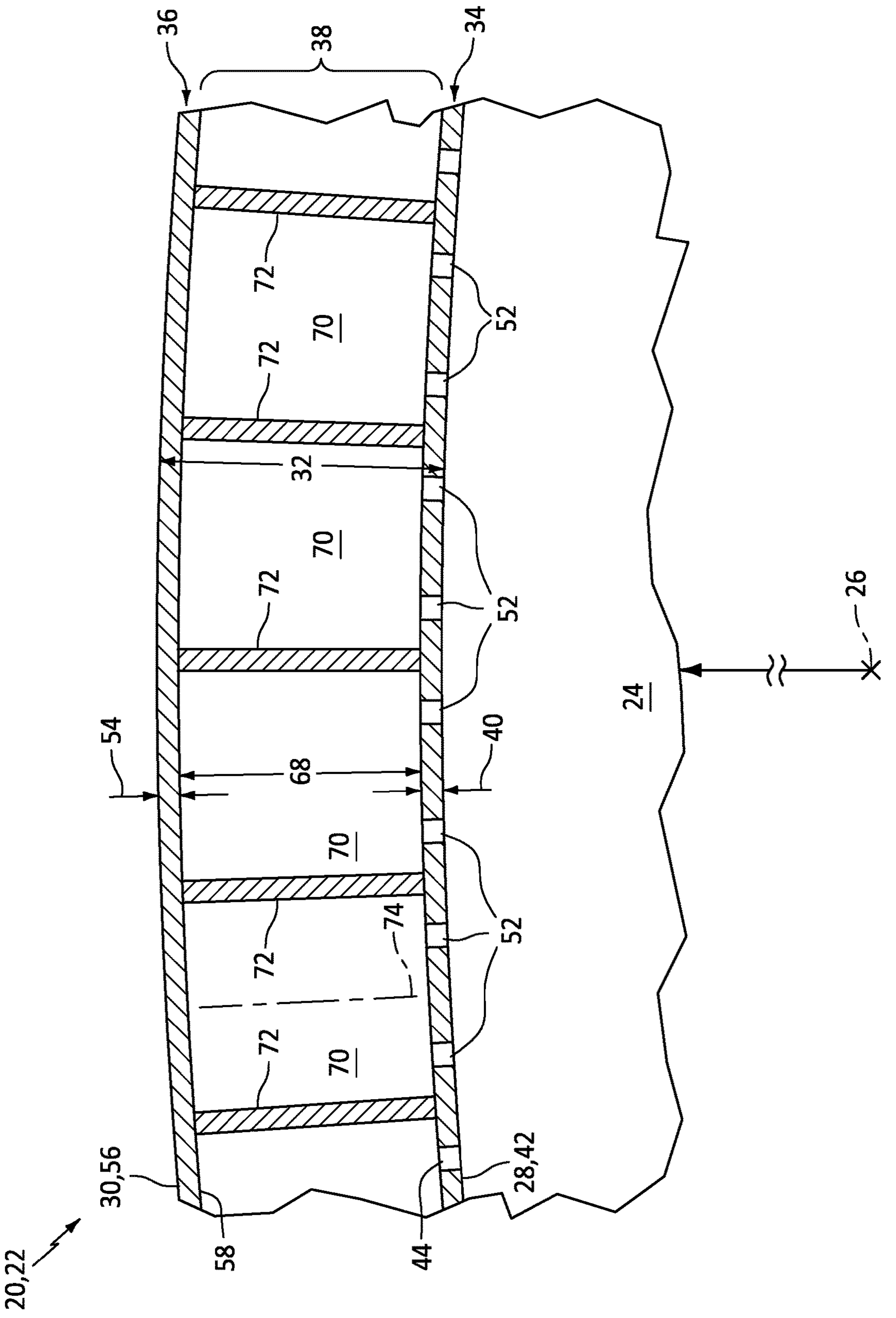
FIG. 2 is a partial cross-sectional illustration of the acoustic panel.

FIGS. 1 and 2 illustrate an exemplary embodiment of the structured panel configured as an acoustic panel 20 (e.g., an acoustic sandwich panel) for an aircraft. This acoustic panel 20 may be configured to attenuate sound (e.g., noise) generated by a propulsion system of the aircraft. The aircraft propulsion system may be a turbofan propulsion system, a turbojet propulsion system, a turboprop propulsion system or any other ducted-rotor and/or open-rotor aircraft propulsion system. The acoustic panel 20 may be part of a housing (e.g., a nacelle) for a powerplant of the aircraft propulsion system; e.g., a gas turbine engine, an electric motor, etc. The acoustic panel 20, for example, may be configured as or otherwise included as part of an inner barrel, an outer barrel, a translating sleeve, a blocker door, a bifurcation, or other nacelle components. Alternatively, the acoustic panel 20 may be part of another component of the aircraft such as, but not limited to, an engine pylon, an aircraft wing, an aircraft control surface, or an aircraft fuselage. The acoustic panel 20 may also or alternatively be configured to attenuate aircraft related sound other than the sound generated by the aircraft propulsion system. Moreover, while the acoustic panel 20 is described with reference to the aircraft propulsion system, the acoustic panel 20 may alternatively be arranged with an auxiliary power unit (APU) for the aircraft, or any other device which generates sound to be attenuated, both for components outside and/or inside of the aircraft. However, for ease of description, the acoustic panel 20 of FIGS. 1 and 2 is described below as attenuating propulsion system sound and with respect to a component 22 (e.g., barrel) of the powerplant housing along a flowpath 24 (e.g., an inlet flowpath, a bypass flowpath, etc.) within the aircraft propulsion system. It is worth noting, while the structured panel is described below as the acoustic panel 20 for ease of description, it is contemplated the structured panel may alternatively be configured as a non-acoustic panel; e.g., a sandwich panel with non-perforated skins.

Referring to FIG. 1, the acoustic panel 20 extends axially along an axis 26. Briefly, this axis 26 may be a centerline axis of the aircraft propulsion system, a centerline axis of the powerplant housing and/or a centerline axis of the component 22 (e.g., the barrel) which is formed by or otherwise includes the acoustic panel 20. The acoustic panel 20 extends radially from a radial inner side 28 of the acoustic panel 20 to a radial outer side 30 of the acoustic panel 20. Referring to FIG. 2, the acoustic panel 20 extends circumferentially about (e.g., partially or completely around) the axis 26. The component 22 and/or its acoustic panel 20 may thereby have a curved (e.g., arcuate, cylindrical, conical, frustoconical) geometry.

With the arrangement of FIGS. 1 and 2, a vertical thickness 32 of the acoustic panel 20 extends in a radial direction relative to the axis 26, and a lateral plane of the acoustic panel 20 extends axially along and circumferentially about the axis 26. The present disclosure, however, is not limited to such an exemplary curved geometry nor such an orientation relative to the axis 26. For example, where the acoustic panel 20 is configured as or part of a sidewall of the bifurcation, the vertical thickness 32 may extend tangentially to a circular reference line about the axis 26, and the lateral plane may extend axially and/or radially relative to the axis 26. However, for ease of description, the acoustic panel 20 is described below with reference to the orientation of FIGS. 1 and 2 where a vertical direction extends radially relative to the axis 26, a first lateral direction extends axially along the axis 26, and a second lateral direction extends circumferentially about the axis 26.

The acoustic panel 20 of FIGS. 1 and 2 includes a perforated face skin 34, a solid (e.g., non-perforated) back skin 36 and a cellular core 38. For ease of description, the face skin 34 is described below as an inner skin of the acoustic panel 20 and the back skin 36 is described below as an outer skin of the acoustic panel 20. With such an arrangement, the acoustic panel 20 and its face skin 34 may form an outer peripheral boundary of at least a portion of the flowpath 24 within the aircraft propulsion system. It is contemplated, however, the face skin 34 may alternatively be the acoustic panel outer skin and the back skin 36 may alternatively be the acoustic panel inner skin with otherwise the same acoustic panel configuration of FIGS. 1 and 2. With such an arrangement, the acoustic panel 20 and its face skin 34 may form an inner peripheral boundary of at least a portion of the flowpath 24 within the aircraft propulsion system. The present disclosure, of course, is not limited to the foregoing exemplary arrangements. The acoustic panel 20, for example, may form a circumferential side boundary of the flowpath 24 and/or may otherwise be located with the aircraft propulsion system and/or the aircraft.

The face skin 34 of FIGS. 1 and 2 extends axially along and circumferentially about the axis 26. The face skin 34 has a vertical thickness 40. This face skin thickness 40 of FIGS. 1 and 2 extends radially between opposing exterior and interior sides 42 and 44 of the face skin 34, where the face skin exterior side 42 is also the inner side 28 of the acoustic panel 20 of FIGS. 1 and 2. The face skin thickness 40 may remain uniform (e.g., constant, the same) as the face skin 34 extends axially along and/or circumferentially about the axis 26. Alternatively, the face skin thickness 40 may be varied as the face skin 34 extends axially along and/or circumferentially about the axis 26.

Figure 3:
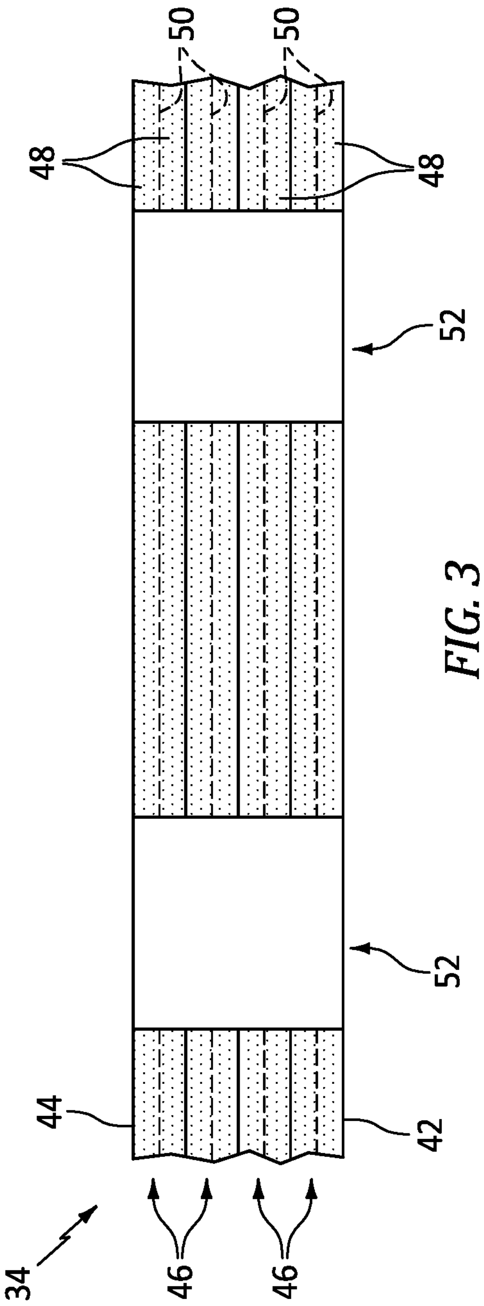
FIG. 3 is a partial sectional illustration of a perforated face skin.

Referring to FIG. 3, the face skin 34 may be formed as a composite skin; e.g., a fiber-reinforced thermoplastic skin. The face skin 34 of FIG. 3, for example, includes one or more layers 46 of face skin material arranged in a stack and consolidated together to form a single monolithic member of the acoustic panel 20 (see FIGS. 1 and 2). The face skin material may be a fiber-reinforced composite material. Each layer 46 of the face skin material, for example, may include a thermoplastic matrix 48 and fiber reinforcement 50 embedded within the thermoplastic matrix 48. The thermoplastic matrix 48 may be a thermoplastic resin such as, but not limited to, thermoplastic film polyamide (PA), polyamide-imide (PAI), polyarylsulfone (PAS), polyethersulfone (PES), polyoxymethylene (POM), polyphenylene sulphide (PPS), polyether ether ketone (PEEK), polyetherimide (PEI), polyethylene terephthalate (PET), polyphthalamide (PPA), poly ether ketone ketone (PEKK), or poly aryl ether ketone (PAEK).

The fiber reinforcement 50 may include fiberglass fibers, carbon fiber fibers, aramid (e.g., Kevlar®) fibers and/or the like. The fiber reinforcement 50 may be arranged as a (e.g., woven or unwoven) sheet of fibers and/or chopped fibers. The present disclosure, however, is not limited to such exemplary face skin materials.

The face skin 34 includes a plurality of perforations 52; e.g., apertures such as through-holes. The face skin perforations 52 are distributed axially and/or circumferentially along the face skin 34 and may (or may not) be equispaced from one another along the face skin 34. Each of the face skin perforations 52 extends longitudinally along a centerline of the respective face skin perforations 52 through the face skin 34 and its layers 46 from the face skin exterior side 42 to the face skin interior side 44. Note, for non-acoustic panel applications, the face skin 34 may alternatively omit the face skin perforations 52 and be configured as a solid (e.g., non-perforated) skin like the back skin 36.

The back skin 36 of FIGS. 1 and 2 extends axially along and circumferentially about the axis 26. The back skin 36 has a vertical thickness 54. This back skin thickness 54 of FIGS. 1 and 2 extends radially between opposing exterior and interior sides 56 and 58 of the back skin 36, where the back skin exterior side 56 is also the outer side 30 of the acoustic panel 20 of FIGS. 1 and 2. The back skin thickness 54 may remain uniform as the back skin 36 extends axially along and/or circumferentially about the axis 26. Alternatively, the back skin thickness 54 may be varied as the back skin 36 extends axially along and/or circumferentially about the axis 26. Referring again to FIGS. 1 and 2, the back skin thickness 54 may be equal to or different (e.g., greater) than the face skin thickness 40.

Figure 4:
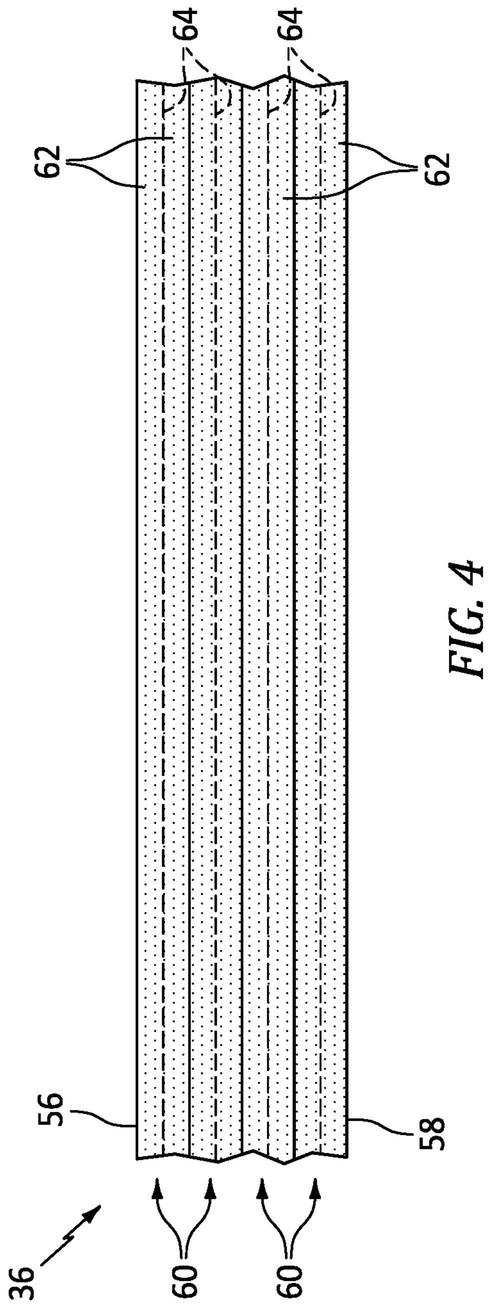
FIG. 4 is a partial sectional illustration of a non-perforated back skin.

Referring to FIG. 4, the back skin 36 may be formed as a composite skin; e.g., a fiber-reinforced thermoplastic skin. The back skin 36 of FIG. 4, for example, includes one or more layers 60 of back skin material arranged in a stack and consolidated together to form a single monolithic member of the acoustic panel 20 (see FIGS. 1 and 2). The back skin material may be a fiber-reinforced composite material. Each layer 60 of the back skin material, for example, may include a thermoplastic matrix 62 and fiber reinforcement 64 embedded within the thermoplastic matrix 62. The thermoplastic matrix 62 may be a thermoplastic resin such as, but not limited to, thermoplastic film polyamide (PA), polyamide-imide (PAI), polyarylsulfone (PAS), polyethersulfone (PES), polyoxymethylene (POM), polyphenylene sulphide (PPS), polyether ether ketone (PEEK), polyetherimide (PEI), polyethylene terephthalate (PET), polyphthalamide (PPA), poly ether ketone ketone (PEKK), or poly aryl ether ketone (PAEK). The fiber reinforcement 64 may include fiberglass fibers, carbon fiber fibers, aramid (e.g., Kevlar®) fibers and/or the like. The fiber reinforcement 64 may be arranged as a (e.g., woven or unwoven) sheet of fibers and/or chopped fibers. The present disclosure, however, is not limited to such exemplary back skin materials. In some embodiments, the back skin material may be the same as the face skin material. In other embodiments, the back skin material may be different than the face skin material. The back skin material, for example, may include a different thermoplastic matrix and/or a different fiber reinforcement than the face skin material.

Referring to FIGS. 1 and 2, the cellular core 38 is arranged and extends radially between the face skin 34 and the back skin 36. One side of the cellular core 38, for example, may be abutted radially against the face skin interior side 44. Another side of the cellular core 38 may be abutted radially against the back skin interior side 58. The cellular core 38 is also connected to the face skin 34 and/or the back skin 36. Each composite skin 34, 36 of FIG. 5, for example, is bonded to the cellular core 38 by a bonding material 66 (e.g., thermoplastic material from a thermoplastic film) as described below in further detail. The bonding material 66 may be (e.g., only include) a thermoplastic resin such as, but not limited to, thermoplastic film polyamide (PA), polyamide-imide (PAI), polyarylsulfone (PAS), polyethersulfone (PES), polyoxymethylene (POM), polyphenylene sulphide (PPS), polyether ether ketone (PEEK), polyetherimide (PEI), polyethylene terephthalate (PET), polyphthalamide (PPA), poly ether ketone ketone (PEKK), or poly aryl ether ketone (PAEK). The present disclosure, however, is not limited to such exemplary bonding materials. In some embodiments, the bonding material 66 may be the same as the thermoplastic matrix 48 in the face skin 34 of FIG. 3 and/or the thermoplastic matrix 62 in the back skin 36 of FIG. 4. In other embodiments, the bonding material 66 may be different than the thermoplastic matrix 48 in the face skin 34 of FIG. 3 and/or the thermoplastic matrix 62 in the back skin 36 of FIG. 4.

The cellular core 38 of FIGS. 1 and 2 extends axially along and circumferentially about the axis 26. The cellular core 38 has a vertical thickness 68. This core thickness 68 of FIGS. 1 and 2 extends radially between and to the face skin 34 at its face skin interior side 44 and the back skin 36 at its back skin interior side 58. The core thickness 68 may remain uniform as the cellular core 38 extends axially along and/or circumferentially about the axis 26. Alternatively, the core thickness 68 may change; e.g., increase or decrease. The core thickness 68, for example, may taper at or near one or more sides of the cellular core 38. The core thickness 68 may be substantially larger than the face skin thickness 40 and/or the back skin thickness 54. The core thickness 68, for example, may be at least two to ten times (2-10×), or more, larger than the face skin thickness 40 and/or the back skin thickness 54. The cellular core 38 of the present disclosure, however, is not limited to such an exemplary dimensional relationship and may vary based on sound attenuation requirements, space requirements, etc.

Figure 6:
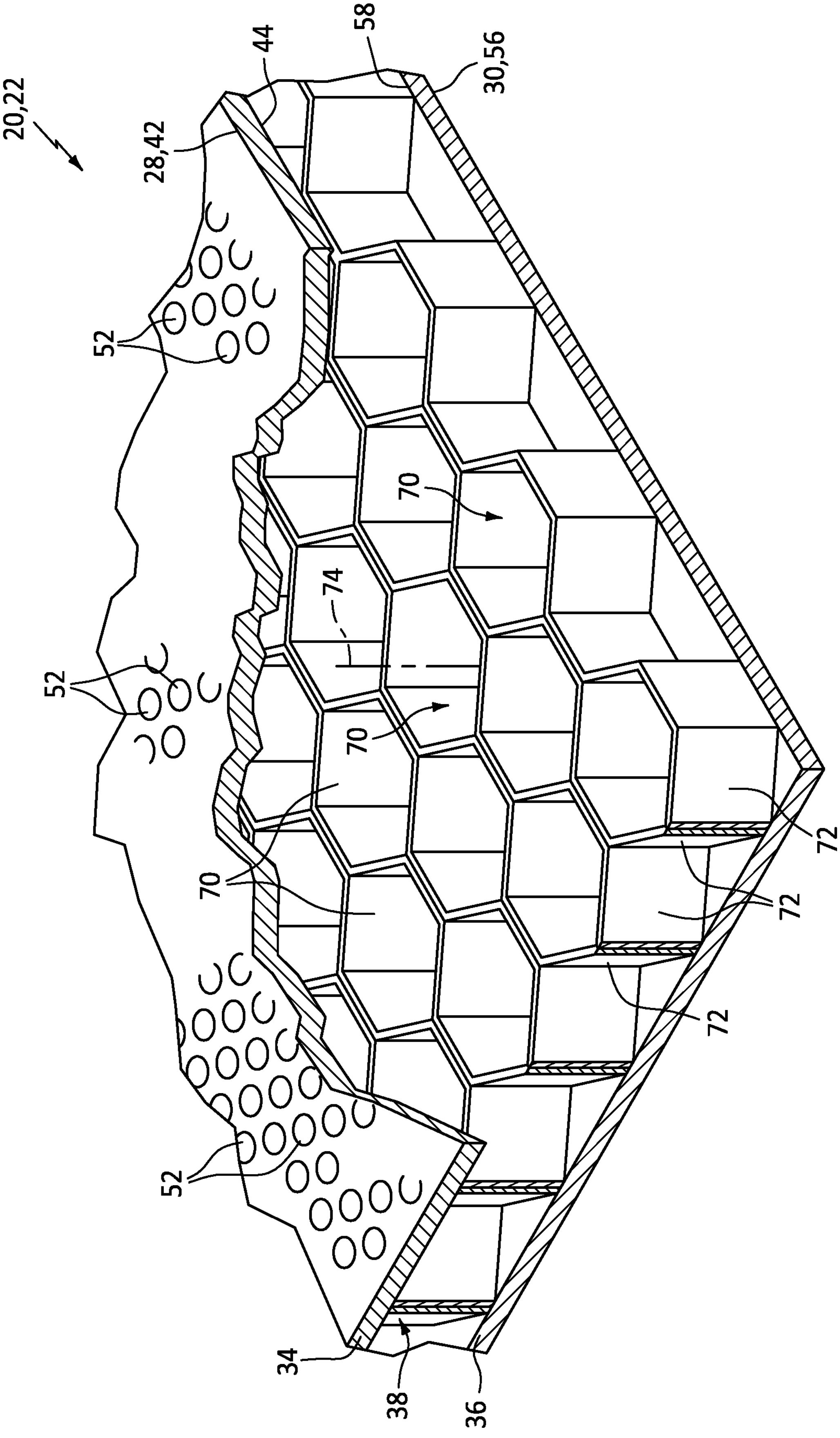
FIG. 6 is a partial perspective cutaway illustration of the acoustic panel.

The cellular core 38 of FIGS. 1 and 2 is configured with one or more internal core cavities 70 (e.g., open internal chambers, acoustic resonance chambers, etc.) radially between the face skin 34 and the back skin 36. Referring to FIG. 6, the cellular core 38 may be configured as a honeycomb core. The cellular core 38 of FIG. 6, for example, includes a plurality of corrugated sidewalls 72. These corrugated sidewalls 72 are arranged in a side-by-side array and are connected to one another such that each neighboring (e.g., adjacent) pair of the corrugated sidewalls 72 forms an array of the core cavities 70 laterally (e.g., circumferentially and/or axially) therebetween. The cellular core 38 and its corrugated sidewalls 72 may be constructed from or otherwise include a core material such as metal; e.g., aluminum (Al), titanium (Ti) or other types of sheet metal. The present disclosure, however, is not limited to such an exemplary cellular core construction nor material. For example, in other embodiments, the cellular core 38 and its corrugated sidewalls 72 may be constructed from or otherwise include a fiber-reinforced composite. Examples of this fiber-reinforced composite include, but are not limited to, a fire-resistant fiber reinforcement such as aramid fibers (e.g., Nomex® fibers) embedded in a polymer matrix; e.g., a thermoset matrix.

Each core cavity 70 of FIGS. 1 and 2 extends radially within/through the cellular core 38 along a respective centerline 74 of the respective core cavity 70 between and to the face skin 34 at its face skin interior side 44 and the back skin 36 at its back skin interior side 58. One or more or all of the core cavities 70 may thereby each overlap and be fluidly coupled with a respective set of one or more of the face skin perforations 52. Referring to FIG. 6, each of the core cavities 70 has a cross-sectional geometry (e.g., shape, size, etc.) when viewed in a reference plane; e.g., a plane perpendicular to the cavity centerline 74 of the respective core cavity 70. This cavity cross-sectional geometry may have a polygonal shape such as a hexagonal shape. The present disclosure, however, is not limited to foregoing exemplary cellular core configuration. Furthermore, various other types of honeycomb cores and, more generally, various other types of cellular cores including various other types of honeycomb cores for an acoustic panel as well as non-acoustic panel applications are known in the art, and the present disclosure is not limited to any particular ones thereof.

The acoustic panel 20 of FIGS. 1 and 2 is configured as a single-degree of freedom (SDOF) acoustic panel. Each of the core cavities 70 of FIGS. 1 and 2, for example, extends radially uninterrupted from the face skin 34 to the back skin 36. With such an arrangement, the acoustic panel 20 may be tuned to attenuate, for example, a select frequency of sound, which tuning may be based on a radial height of each core cavity 70/the core thickness 68. The present disclosure, however, is not limited to single-degree of freedom acoustic panel applications. It is contemplated, for example, at least (or only) one perforated septum, for example, may be arranged in each of the core cavities 70 (or a subset of the core cavities 70) to configure the acoustic panel 20 as a multi-degree of freedom (e.g., a double-degree of freedom) acoustic panel. Various types and configurations of acoustic panel septums are known in the art, and the present disclosure is not limited to any particular ones thereof.

During operation of the acoustic panel 20 of FIGS. 1 and 2, sound waves may enter a respective core cavity 70 through the respective face skin perforation(s) 52. These sound waves may travel through the core cavity 70 and reflect against the back skin 36. The reflected sound waves may travel back through the core cavity 70 and exit the acoustic panel 20 through the respective face skin perforation(s) 52, where those reflected sound waves may be out of phase from and destructively interfere with incoming soundwaves. Of course, the sound waves may also or alternatively reflect against one or more other elements of the acoustic panel 20 which may further influence sound attenuation.

Figure 7:
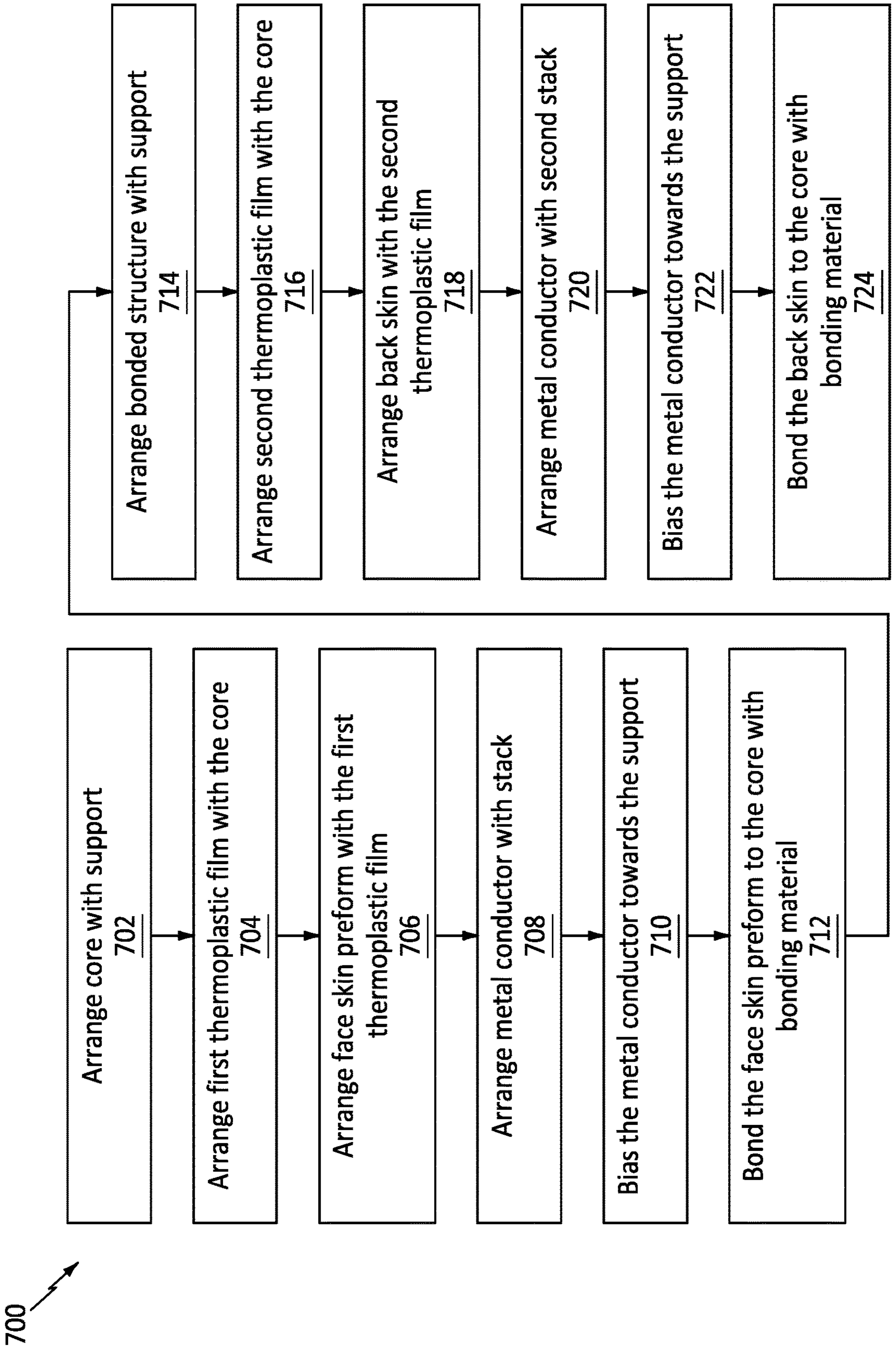
FIG. 7 is a flow diagram of a method for forming a structured panel such as the acoustic panel.

FIG. 7 is a flow diagram of a method 700 for forming a structured panel such as, but not limited to, a sandwich panel. For ease of description, the formation method 700 is described below with respect to forming the acoustic panel 20 described above. The formation method 700 of the present disclosure, however, is not limited to forming such an exemplary acoustic panel, nor to forming structured panels as acoustic panels or non-acoustic panels.

Figure 8:
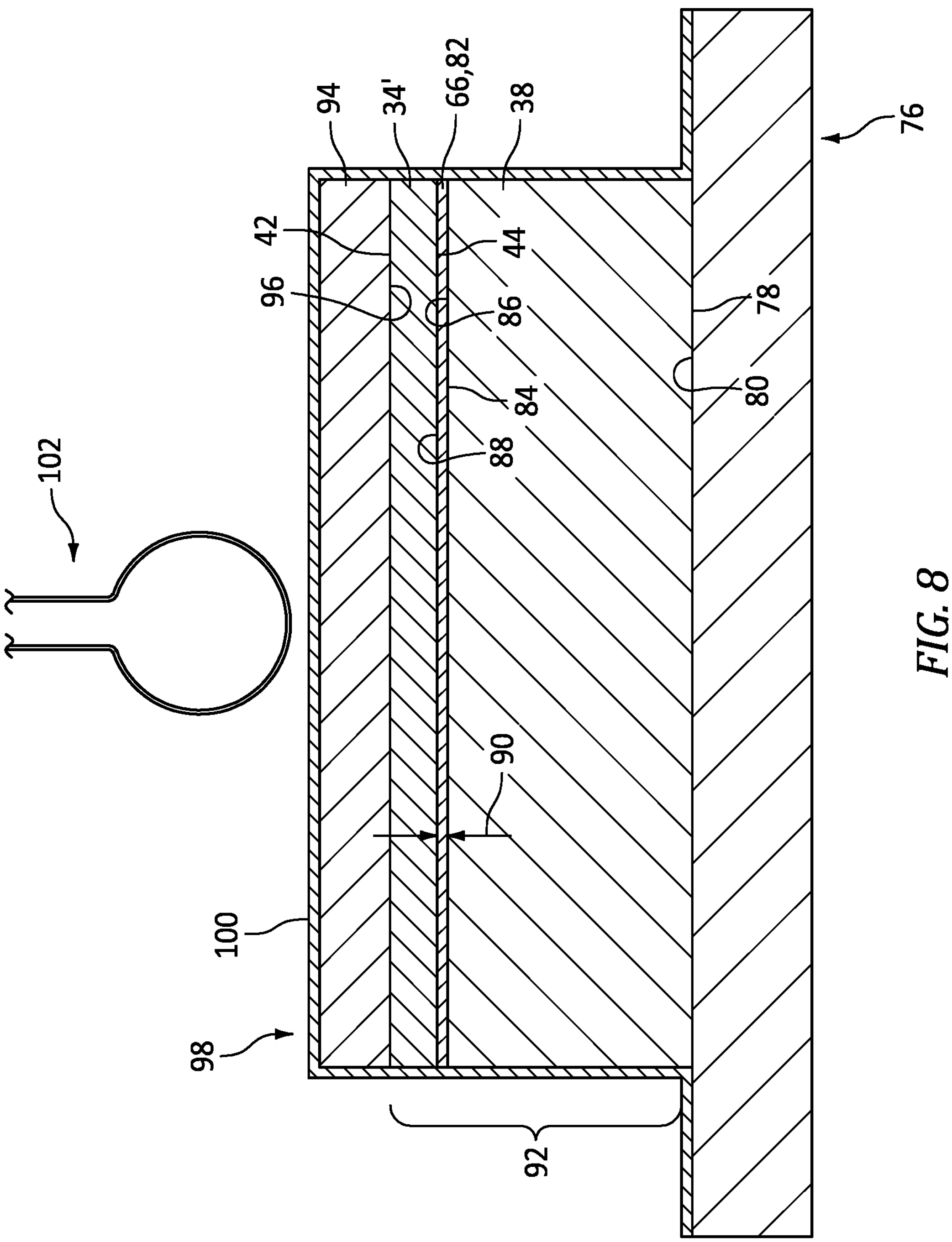
FIG. 8 is a partial sectional illustration depicting bonding of the cellular core to a first composite skin to provide a bonded structure.

In step 702, referring to FIG. 8, the cellular core 38 (e.g., the honeycomb core) is arranged with a rigid support 76; e.g., (e.g., metal) tooling such as a formation die, a support plate, etc. The cellular core 38 of FIG. 8, for example, is disposed on top of the rigid support 76 such that a first side 78 of the cellular core 38 engages (e.g., is abutted against, contacts, lays on, etc.) a support surface 80 of the rigid support 76. Prior to arranging the cellular core 38 with the rigid support 76, the cellular core 38 may first be prepared for bonding. The cellular core 38, for example, may be cleaned to remove any debris, fluids (e.g., oils, coatings, etc.) or the like from any mating surface or an entirety of the cellular core 38.

In step 704, a first thermoplastic film 82 is arranged with the cellular core 38. The first thermoplastic film 82 of FIG. 8, for example, is disposed on top of the cellular core 38 such that a first side 84 of the first thermoplastic film 82 engages (e.g., is abutted against, contacts, lays on, etc.) a second side 86 of the cellular core 38, where the core second side 86 is vertically opposite the core first side 78. Prior to arranging the first thermoplastic film 82 with the cellular core 38, the first thermoplastic film 82 may first be prepared for bonding. The first thermoplastic film 82, for example, may be cleaned to remove any debris, fluids (e.g., oils, coatings, etc.) or the like from any mating surface or an entirety of the first thermoplastic film 82. The film first side 84 and a second side 88 of the first thermoplastic film 82 vertically opposite the film first side 84, for example, may be wiped down with isopropyl alcohol (or another solvent) and a cloth.

The first thermoplastic film 82 is a film of the bonding material 66; e.g., a film formed from thermoplastic resin without any fiber reinforcement. This first thermoplastic film 82 has a vertical thickness 90 that extends vertically between the film first side 84 and the film second side 88. This film thickness 90 may remain uniform as the first thermoplastic film 82 extends laterally (e.g., axially along and/or circumferentially) along the cellular core 38. The film thickness 90 is sized smaller than the core thickness 68 as well as the face skin thickness 40 and the back skin thickness 54 of FIGS. 1 and 2. The film thickness 90, for example, may be sized equal to or close to a vertical thickness of a single layer (or two layers) of the face skin 34 of FIG. 3 and/or a single layer (or two layers) of the back skin 36 of FIG. 4. The present disclosure, however, is not limited to the foregoing exemplary dimensional relationships.

In step 706, a first composite skin is arranged with the first thermoplastic film 82. For ease of description, the first composite skin is described below as a preform 34' of the face skin 34 (see FIGS. 1 and 2); e.g., the material of the face skin 34 without any of the face skin perforations 52. Note, the face skin perforations 52 are formed in the preform 34' to form the face skin 34 following the bonding of the preform 34' to the cellular core 38 as described below. It is contemplated, however, the first composite skin may alternatively be the back skin 36 (see FIGS. 1 and 2). Referring again to FIG. 8, the face skin preform 34' (e.g., the first skin material without any perforations) is disposed on top of the first thermoplastic film 82 such that the face skin interior side 44 engages (e.g., is abutted against, contacts, lays on, etc.) the film second side 88. Prior to arranging the face skin preform 34' with the first thermoplastic film 82, the face skin preform 34' may first be prepared for bonding. The face skin preform 34', for example, may be cleaned to remove any debris, fluids (e.g., oils, coatings, etc.) or the like from any mating surface or an entirety of the face skin preform 34'. The face skin exterior side 42 and the face skin interior side 44, for example, may be wiped down with isopropyl alcohol (or another solvent) and a cloth.

In FIG. 8, the cellular core 38, the first thermoplastic film 82 and the face skin preform 34' are arranged in a stack 92 on the rigid support 76. Here, the cellular core 38 is disposed vertically between and (e.g., completely) separates the first thermoplastic film 82 from the rigid support 76. The first thermoplastic film 82 is disposed vertically between and (e.g., completely) separates the cellular core 38 from the face skin preform 34'.

In step 708, a metal conductor 94 is arranged with the stack 92. The metal conductor 94 of FIG. 8, for example, is disposed on top of the face skin preform 34' such that a first side 96 of the metal conductor 94 engages (e.g., is abutted against, contacts, lays on, etc.) the face skin exterior side 42. The metal conductor 94 may be configured as a metal plate or another piece of metal tooling. Here, the face skin preform 34' is disposed vertically between and (e.g., completely) separates the first thermoplastic film 82 from the metal conductor 94.

In step 710, the metal conductor 94 is biased vertically towards the rigid support 76. The stack members 38, 82 and 34' and the metal conductor 94 of FIG. 8, for example, may be vacuum bagged together and against the rigid support 76. The stack 92 of FIG. 8 may thereby be vertically preloaded between the metal conductor 94 and the rigid support 76 using a vacuum bag 98, where the stack members 38, 82 and 34' and the metal conductor 94 are arranged within a vacuum bag cavity vertically between a wall 100 of the vacuum bag 98 and the rigid support 76.

Figure 5:
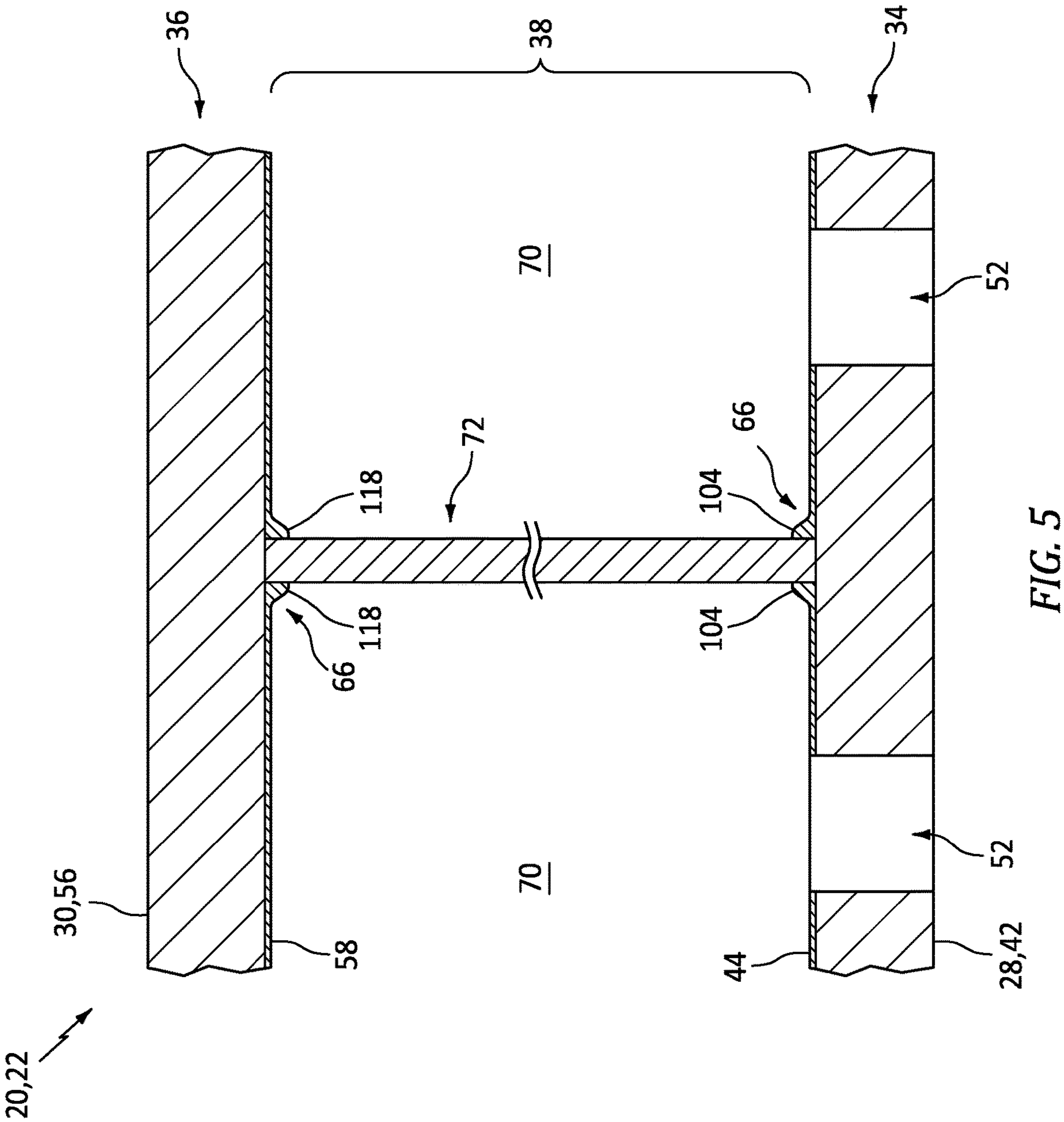
FIG. 5 is a partial sectional illustration of the acoustic panel depicting bonds between a cellular core and the face and the back skins.

In step 712, the face skin preform 34' is bonded to the cellular core 38 with the bonding material 66 of the first thermoplastic film 82. The metal conductor 94 of FIG. 8, for example, is induction heated using an induction coil 102. The heated metal conductor 94, in turn, heats the first thermoplastic film 82 by conduction through the face skin preform 34'. Here, the first thermoplastic film 82 is heated enough to melt the bonding material 66 of the first thermoplastic film 82 to a softened, compliant state. However, the heating of the first thermoplastic film 82 should be low enough so as not to liquify the bonding material 66. By melting the bonding material 66 while the first thermoplastic film 82 is preloaded vertically between the cellular core 38 and the face skin preform 34', the sidewalls 72 of the cellular core 38 may press vertically into the first thermoplastic film 82 such that the bonding material 66 forms one or more fillets 104 associated with each sidewall 72 as shown in FIG. 5. In FIG. 5, each fillet 104 extends vertically and laterally along the respective sidewall 72 as well as contacts the respective sidewall 72. A physical bond may thereby be provided between the bonding material 66 and the cellular core 38 and its sidewalls 72 to connect the bonding material 66 to the cellular core 38. In addition, the melted bonding material 66 may simultaneously bond with the thermoplastic matrix 48 (see FIG. 3) in the vertically adjacent face skin preform 34' (see FIG. 8). Therefore, following cooling and solidification of the bonding material 66, the bonding material 66 bonds the cellular core 38 to the face skin preform 34' (see FIG. 8). The melted bonding material 66 may thereby provide a hot melt adhesive between the face skin preform 34' and the cellular core 38. A bonded structure 106 of the panel members 38, 82 and 34' (see FIG. 9) may then be removed from the vacuum bag 98 of FIG. 8.

Figure 9:
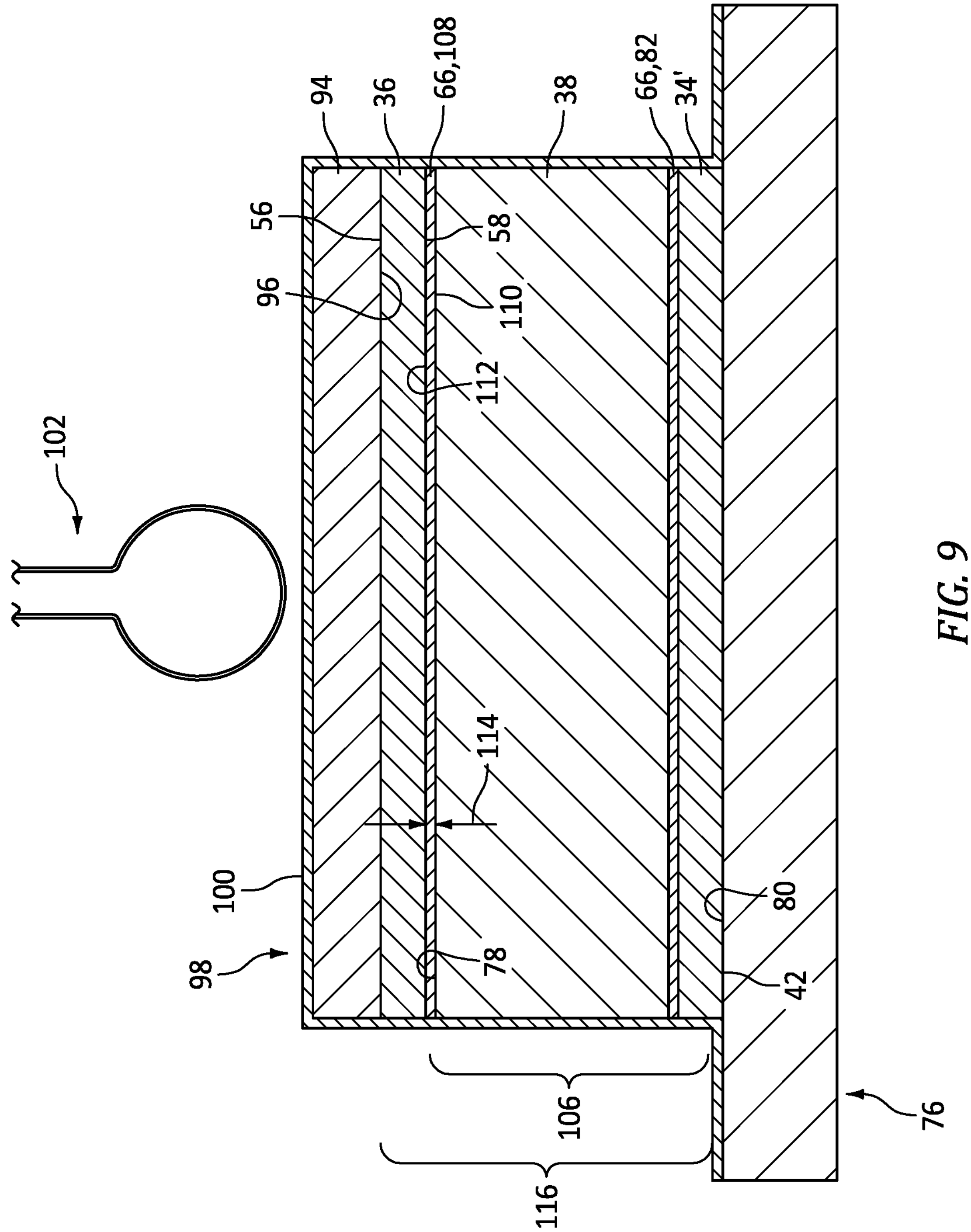
FIG. 9 is a partial sectional illustration depicting bonding of the bonded structure to a second composite skin.

In step 714, referring to FIG. 9, the bonded structure 106 is arranged with the rigid support 76. The bonded structure 106 of FIG. 9, for example, is disposed on top of the rigid support 76 such that the face skin exterior side 42 engages (e.g., is abutted against, contacts, lays on, etc.) the support surface 80 of the rigid support 76. Prior to arranging the bonded structure 106 with the rigid support 76, the bonded structure 106 may first be prepared for bonding. The cellular core 38, for example, may be recleaned (as needed) to remove any debris, fluids (e.g., oils, coatings, etc.) or the like from any mating surface or an entirety of the cellular core 38.

In step 716, a second thermoplastic film 108 is arranged with the cellular core 38. The second thermoplastic film 108 of FIG. 9, for example, is disposed on top of the cellular core 38 such that a first side 110 of the second thermoplastic film 108 engages (e.g., is abutted against, contacts, lays on, etc.) the core first side 78. Prior to arranging the second thermoplastic film 108 with the cellular, the second thermoplastic film 108 may first be prepared for bonding. The second thermoplastic film 108, for example, may be cleaned to remove any debris, fluids (e.g., oils, coatings, etc.) or the like from any mating surface or an entirety of the second thermoplastic film 108. The film first side 110 and a second side 112 of the second thermoplastic film 108 vertically opposite the film first side 110, for example, may be wiped down with isopropyl alcohol (or another solvent) and a cloth.

The second thermoplastic film 108 is another film of the bonding material 66; e.g., a film formed from thermoplastic resin without any fiber reinforcement. This second thermoplastic film 108 has a vertical thickness 114 that extends vertically between the film first side 110 and the film second side 112. This film thickness 114 may remain uniform as the second thermoplastic film 108 extends laterally (e.g., axially along and/or circumferentially) along the cellular core 38. The film thickness 114 is sized smaller than the core thickness 68 as well as the face skin thickness 40 and the back skin thickness 54 of FIGS. 1 and 2. The film thickness

114, for example, may be between 0.002 and 0.015 inches. The present disclosure, however, is not limited to the foregoing exemplary dimensional relationships.

In step 718, a second composite skin is arranged with the second thermoplastic film 108. For ease of description, the second composite skin is described below as the back skin 36. It is contemplated, however, the second composite skin may alternatively be the face skin preform 34'. Referring again to FIG. 9, the back skin 36 is disposed on top of the second thermoplastic film 108 such that the back skin interior side 58 engages (e.g., is abutted against, contacts, lays on, etc.) the film second side 112. Prior to arranging the back skin 36 with the second thermoplastic film 108, the back skin 36 may first be prepared for bonding. The back skin 36, for example, may be cleaned to remove any debris, fluids (e.g., oils, coatings, etc.) or the like from any mating surface or an entirety of the back skin 36. The back skin exterior side 56 and the back skin interior side 58, for example, may be wiped down with isopropyl alcohol (or another solvent) and a cloth.

In FIG. 9, the bonded structure 106, the second thermoplastic film 108 and the back skin 36 are arranged in a second stack 116 on the rigid support 76. Here, the cellular core 38 is disposed vertically between and (e.g., completely) separates the second thermoplastic film 108 from the bonded face skin preform 34'. The second thermoplastic film 108 is disposed vertically between and (e.g., completely) separates the cellular core 38 from the back skin 36.

In step 720, the metal conductor 94 is arranged with the second stack 116. The metal conductor 94 of FIG. 9, for example, is disposed on top of the back skin 36 such that the first side 96 of the metal conductor 94 engages (e.g., is abutted against, contacts, lays on, etc.) the back skin exterior side 56. Here, the back skin 36 is disposed vertically between and (e.g., completely) separates the second thermoplastic film 108 from the metal conductor 94.

In step 722, the metal conductor 94 is biased vertically towards the rigid support 76. The stack members 106, 108 and 36 and the metal conductor 94 of FIG. 9, for example, may be vacuum bagged together and against the rigid support 76. The second stack 116 of FIG. 9 may thereby be vertically preloaded between the metal conductor 94 and the rigid support 76 using the vacuum bag 98, where the stack members 106, 108 and 36 and the metal conductor 94 are arranged within the vacuum bag cavity vertically between the wall 100 of the vacuum bag 98 and the rigid support 76.

In step 724, the back skin 36 is bonded to the cellular core 38 with the bonding material 66 of the second thermoplastic film 108. The metal conductor 94 of FIG. 9, for example, is induction heated using the induction coil 102. The heated metal conductor 94, in turn, heats the second thermoplastic film 108 by conduction through the back skin 36. Here, the second thermoplastic film 108 is heated enough to melt the bonding material 66 of the second thermoplastic film 108 to a softened, compliant state. However, the heating of the second thermoplastic film 108 should be low enough so as not to liquify the bonding material 66. By melting the bonding material 66 while the second thermoplastic film 108 is preloaded vertically between the cellular core 38 and the back skin 36, the sidewalls 72 of the cellular core 38 may press vertically into the second thermoplastic film 108 such that the bonding material 66 forms one or more fillets 118 associated with each sidewall 72 as shown in FIG. 5. In FIG. 5, each fillet 118 extends vertically and laterally along the respective sidewall 72 as well as contacts the respective sidewall 72. A physical bond may thereby be provided between the bonding material 66 and the cellular core 38 and its sidewalls 72 to connect the bonding material 66 to the cellular core 38. In addition, the melted bonding material 66 may simultaneously bond with the thermoplastic matrix 62 (see FIG. 4) in the vertically adjacent back skin 36 (see FIG. 9). Therefore, following cooling and solidification of the bonding material 66, the bonding material 66 bonds the cellular core 38 to the back skin 36 (see FIG. 9). The melted bonding material 66 may thereby provide a hot melt adhesive between the back skin 36 and the cellular core 38. A bonded structure of the panel members 34', 82, 38, 108 and 36 may then be removed from the vacuum bag 98 of FIG. 9.

Following the foregoing bonding process, the face skin preform 34' may be perforated to form the face skin 34 and provide the acoustic panel 20.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A formation method, comprising:

arranging a honeycomb core, a thermoplastic film and a fiber-reinforced thermoplastic skin in a stack with the thermoplastic film between the honeycomb core and the fiber-reinforced thermoplastic skin, the thermoplastic film comprising a thermoplastic material;

arranging a metal conductor on the stack with the fiber-reinforced thermoplastic skin between the thermoplastic film and the metal conductor;

induction heating the metal conductor to provide a heated metal conductor;

conduction heating the thermoplastic film through the fiber-reinforced thermoplastic skin using the heated metal conductor to melt the thermoplastic film and bond the fiber-reinforced thermoplastic skin to the honeycomb core with the thermoplastic material to provide a first structure;

arranging the first structure, a second thermoplastic film and a second fiber-reinforced thermoplastic skin in a second stack with the second thermoplastic film between the honeycomb core and the second fiber-reinforced thermoplastic skin, the second thermoplastic film comprising a second thermoplastic material;

arranging the metal conductor on the second stack with the second fiber-reinforced thermoplastic skin between the second thermoplastic film and the metal conductor;

induction heating the metal conductor to provide a reheated metal conductor; and conduction heating the second thermoplastic film through the second fiber-reinforced thermoplastic skin using the reheated metal conductor to melt the second thermoplastic film and bond the second fiber-reinforced thermoplastic skin to the honeycomb core with the second thermoplastic material and provide a sandwich structure.

2. The formation method of claim 1, further comprising perforating the fiber-reinforced thermoplastic skin or the second fiber-reinforced thermoplastic skin to configure the sandwich structure as an acoustic panel.

3. The formation method of claim 1, further comprising biasing the metal conductor towards the honeycomb core during the induction heating and the conduction heating.

4. The formation method of claim 3, wherein the metal conductor is biased towards the honeycomb core using a vacuum bag.

5. The formation method of claim 1, wherein the thermoplastic material is a thermoplastic resin; and the thermoplastic film consists essentially of the thermoplastic resin.

6. The formation method of claim 1, wherein, when the fiber-reinforced thermoplastic skin is bonded to the honeycomb core with the thermoplastic material, the thermoplastic material is melted to adhere the fiber-reinforced thermoplastic skin to the honeycomb core.

7. The formation method of claim 1, wherein the honeycomb core includes a sidewall; and a pair of fillets formed by the thermoplastic material extends along and contacts opposing sides of the sidewall when the fiber-reinforced thermoplastic skin is bonded to the honeycomb core with the thermoplastic material.

8. The formation method of claim 1, further comprising supporting the stack on a rigid support during the induction heating and the conduction heating.

9. The formation method of claim 1, wherein the honeycomb core comprises a metal material.

10. The formation method of claim 1, wherein the honeycomb core comprises a non-metal material.

11. The formation method of claim 1, further comprising cleaning the honeycomb core prior to arranging the honeycomb core in the stack.

12. The formation method of claim 1, further comprising cleaning the thermoplastic film prior to arranging the thermoplastic film in the stack.

13. The formation method of claim 1, further comprising cleaning the fiber-reinforced thermoplastic skin prior to arranging the fiber-reinforced thermoplastic skin in the stack.

14. The formation method of claim 1, wherein the thermoplastic material comprises at least one of polyamide (PA), polyamide-imide (PAI), polyarylsulfone (PAS), polyethersulfone (PES), polyoxymethylene (POM), polyphenylene sulphide (PPS), polyether ether ketone (PEEK), polyetherimide (PEI), polyethylene terephthalate (PET), polyphthalamide (PPA), poly ether ketone ketone (PEKK), or poly aryl ether ketone (PAEK).

* * * * *